United States Patent
Hutton

(10) Patent No.: US 7,499,476 B1
(45) Date of Patent: Mar. 3, 2009

(54) COMPACT TWO-BEAM PUSH-PULL FREE ELECTRON LASER

(75) Inventor: Andrew Hutton, Yorktown, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 0 days.

(21) Appl. No.: 11/900,342

(22) Filed: Sep. 11, 2007

(51) Int. Cl.
*H01S 3/00* (2006.01)

(52) U.S. Cl. .................... 372/2; 372/73; 372/74

(58) Field of Classification Search .......... 372/2, 372/73, 74
See application file for complete search history.

(56) References Cited

U.S. PATENT DOCUMENTS

| | | | | | |
|---|---|---|---|---|---|
| 4,287,488 | A | * | 9/1981 | Brau et al. | 372/2 |
| 4,562,380 | A | * | 12/1985 | Dionne | 315/4 |
| 4,999,839 | A | * | 3/1991 | Deacon | 372/2 |
| 5,010,555 | A | * | 4/1991 | Madey et al. | 372/2 |
| 5,130,994 | A | * | 7/1992 | Madey et al. | 372/2 |
| 7,196,601 | B1 | * | 3/2007 | Gottschalk | 335/217 |
| 7,382,861 | B2 | * | 6/2008 | Madey et al. | 378/119 |
| 2002/0191650 | A1 | * | 12/2002 | Madey et al. | 372/2 |
| 2003/0026300 | A1 | * | 2/2003 | Biedron et al. | 372/2 |
| 2003/0179784 | A1 | * | 9/2003 | Minehara et al. | 372/2 |
| 2007/0014392 | A1 | * | 1/2007 | Madey et al. | 378/119 |

OTHER PUBLICATIONS

Paul Preuss, "Into the future at the speed of light The advanced photon science intitiative" Dec. 14, 2007, p. 1-5.*
Beam Physics & FEL Laboratory, "Free-electron Laser" Radiation Physics and Chemistry, 2004, pp. 559-569.*
Eckart Groose, "THz radiation from free electron lasers and its potential for cell and tissue studies" Institute of Physics Publishing, 2002, pp. 3754-3760.*
A. Buchner, et aal. "The ELBE-project at dreden-Rossendorf" 2000, pp. 732-734.*
NS. Ginzgurg et. al. "Fel With Orotron Type Feedback", Proceding of Fel, 2007, Novosibirsk, Russia, pp. 60-64.*
Google Search Oct. 23, 2008.*
H.P. Freund et.al., "Free-Electron Lasers:Vaccum Electronic Generator of Coherent Radiation", IEEE, 1999, pp. 782-803.*
Srinivas Krishnagopal, et al "Free Electron Laser" Current Science, vol. 87, No. 8, Oct. 25, 2004, pp. 1066-1078.*
B.L. Militsyn et.al, "Felice the Free Electron Laser for Intra-Cavity Experiments" 2003, Elsevier Science B.V. p. 495-497.*

* cited by examiner

*Primary Examiner*—Minsun Harvey
*Assistant Examiner*—Delma R Forde

(57) ABSTRACT

An ultra-compact free electron laser comprising a pair of opposed superconducting cavities that produce identical electron beams moving in opposite directions such that each set of superconducting cavities accelerates one electron beam and decelerates the other electron beam. Such an arrangement, allows the energy used to accelerate one beam to be recovered and used again to accelerate the second beam, thus, each electron beam is decelerated by a different structure than that which accelerated it so that energy exchange rather than recovery is achieved resulting in a more compact and highly efficient apparatus.

3 Claims, 1 Drawing Sheet

COMPACT TWO-BEAM PUSH-PULL FREE ELECTRON LASER

The United States of America may have certain rights to this invention under Management and Operating Contract DE-AC05-06OR23177 from the United States Department of Energy.

FIELD OF THE INVENTION

The present invention relates to free electron lasers and more particularly to such an ultra-compact such a device for the production of tunable coherent light in small free-standing laboratories.

BACKGROUND OF THE INVENTION

The energy recovered free electron laser (FEL) at Jefferson Laboratories in Newport News, Va. accelerates an electron beam in superconducting cavities and transfers it through a wiggler to produce light pulses and returns it to the beginning of the superconducting cavities at a phase that decelerates the beam so that energy is returned to the cavities. The light pulses from the wiggler are contained in an optical resonator (a pair of mirrors spaced a precise multiple of the bunch separation) that synchronously reflects the light back to the wiggler to a later electron bunch to provide stimulated, amplified light emissions.

While free electron lasers associated with large particle accelerators such as that at the Jefferson Laboratory in Newport News, Va. provide highly useful research tools, such devices, largely because of their cost and size are not widely available in, for example, universities or small research institutes.

Accordingly, the development of a compact high power free electron laser capable of producing tuneable coherent light would open experimentation with such devices to a much broader class of investigators and could result in the development of even more useful applications thereof.

OBJECT OF THE INVENTION

It is therefore an object of the present invention to provide an ultra-compact, high power free electron laser for the production of tuneable light that could be made available to universities and small research institutes.

SUMMARY OF THE INVENTION

According to the present invention there is provided an ultra-compact free electron laser comprising a pair of opposed superconducting cavities that produce identical electron beams moving in opposite directions such that each set of superconducting cavities accelerates one electron beam and decelerates the other electron beam. Such an arrangement, allows the energy used to accelerate one beam to be recovered and used again to accelerate the second beam, thus, each electron beam is decelerated by a different structure than that which accelerated it so that energy exchange rather than recovery is achieved resulting in a more compact and highly efficient apparatus.

DETAILED DESCRIPTION

Figure 1:
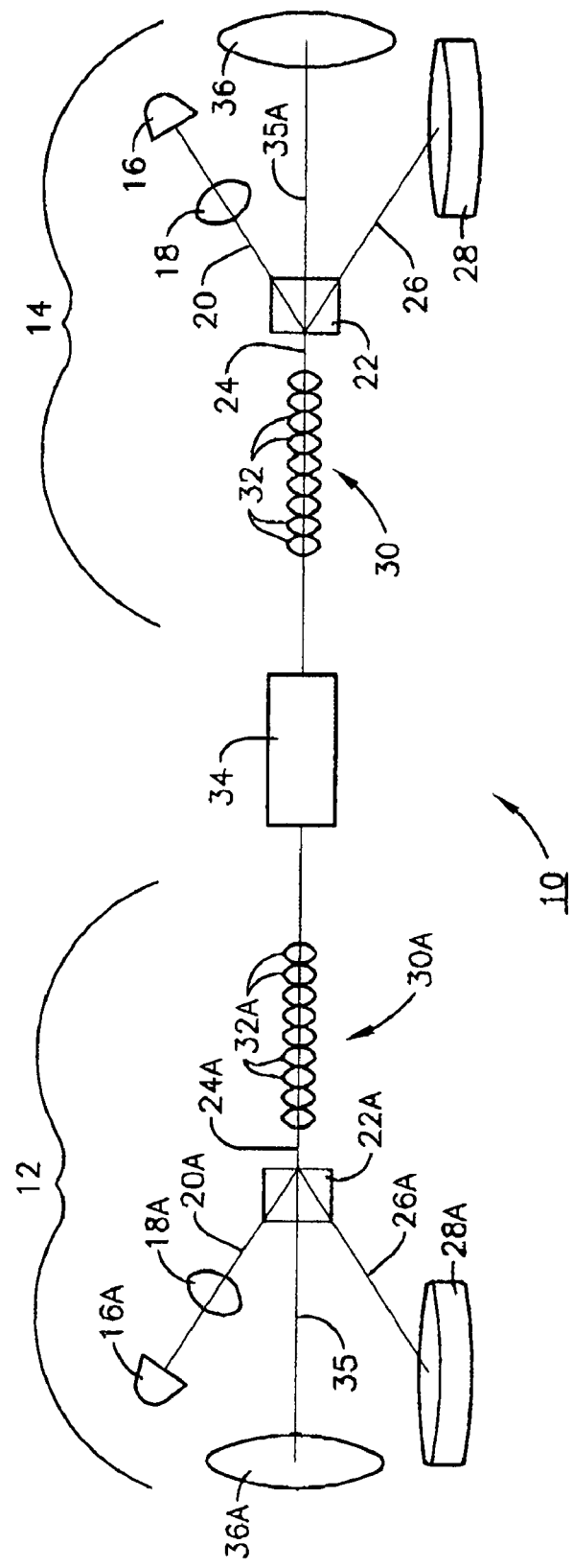
FIG. 1 is a schematic representation of the free electron laser of the present invention.

Referring now to the accompanying FIG. 1, as shown in that drawing, the compact free electron laser of the present invention 10 comprises a pair of opposed sets of electron generators 12 and 14, each comprising an electron injector or gun 16 and 16A that injects electron beams 20 and 20A into cryocavities 18 and 18A where separator or bend magnets 22 and 22A bring electron beams 20 and 20A onto acceleration axes 24 and 24A and also bend spent beams 26 and 26A to dumps 28 and 28A. It is important to note that bend magnets 22 and 22A must be designed to transport electrons with a large (~50%) energy spread to the dump with very small losses. As used herein, the term "electron beam" is meant to be synonymous with the term "electron bunches" as the electron beam is comprised of electron bunches.

Electron beams 20 and 20A on acceleration axes 24 and 24A are introduced into cryomodules 30 and 30A comprising a series of superconducting cavities 32 and 32A and thence into wiggler 34 to produces light pulses that are captured and amplified in conventional fashion.

Operation of the compact free electron laser just described is as follows: a bunch of electrons 20A produced by electron gun 16A is accelerated by superconducting or cryocavity 18A and brought onto axis 24A of cryomodule 30A by separator magnet 22A. Electron bunch 20A is then accelerated by cryomodule 30A into wiggler 34 where it emits light. From there electron bunch 20A is decelerated in cryomodule 30 and deflected into dump 28 by separator magnet 22. The light pulse 35A produced in wiggler 34 travels with electron bunch 20A through cryomodule 30 but is not deflected by separator magnet 22 and continues on to a partial mirror 36 where most of it is reflected back along axis 24 while a small fraction exits the system as a coherent laser pulse.

Simultaneously, a second electron bunch 20 leaves gun 16, is accelerated by cryocavity 18 and is brought onto axis 24 of cryomodule 30 by separator magnet 22 in synchronism with light pulse 35A reflected from partial mirror 36. The second electron bunch 20 is accelerated by cryomodule 30 arriving at wiggler 34 at the same time as the reflected light pulse so that light amplification can occur. Second electron bunch 20 is then decelerated in cryomodule 30A and is deflected into dump 28A by separator magnet 22A. Light pulse 35 is not deflected by separator magnet 22A and continues on to partial mirror 36A where it is reflected back along axis 24A ready to meet the next electron bunch from gun 16A.

In this fashion, the energy in cryomodules 30 and 30A is recovered completely while a fraction of the energy imparted to the electron beam/bunch by guns 16 and 16A is partially converted to free electron laser light and partially dissipated in dumps 28 and 28A. Thus, the maximum free electron laser power that can be extracted is a fraction (up to about 50%) of the power of guns 16 and 16A.

Table 1 shows an example of a parameter set based upon the design parameters of a 10 kW free electron laser, the design of that installed at the Jeeferson Laboratories facility at Newport News, Va. The superconducting cavities in this example are based upon DESY X-FEL prototypes as described in R. Brinkman, et al. (editors) DESY 2002-167 (2002).

TABLE 1

| Parameter | 10 kW JLab FEL Design | Push-Pull FEL Design |
| --- | --- | --- |
| Maximum Beam Energy | 80-210 MeV | 200 MeV |
| Injector Beam Energy | 10 MeV | 10 MeV |
| Beam Current | 10 mA | 2 × 1 mA |
| Beam Power | 800-2100 kW | 2 × 200 kW |
| Non-Recovered Beam Power | 100 kW | 2 × 10 kW |
| RF Frequency | 1497 MHz | 1300 MHz |
| FEL Repetition Rate | 4.68-74.85 MHz RF Frequency/ (20-320) | 10.156 MHz RF Frequency/128 |

TABLE 1-continued

| Parameter | 10 kW JLab FEL Design | Push-Pull FEL Design |
|---|---|---|
| Optical Cavity Length | 32 meter | 29.539 meter |
| Bunch Charge | 135 pC @ 75 MHz | 100 pC |
| Energy Spread after Wiggler | 10% of 210 MeV | 2.5% of 200 MeV |
| FEL Output Power | 10 kW | >1 kW |

It can be seen that an output power in excess of a kilowatt can be produced. Changing the wiggler and mirrors makes it possible to cover wavelength ranges from the ultraviolet through the visible to the infrared.

There has thus been described an ultra-compact high power free electron laser that is capable of producing coherent light over a wide range of wavelengths.

What is claimed is:

1. A compact two-beam push-pull free electron laser comprising:

A) a pair of opposed electron beam acclerators that produce identical first and second electron beams moving in opposite directions such that each set of superconducting cavities accelerates one electron beam and decelerates the other electron beam; and B) a wiggler located intermediate the pair of opposed electron beam accelerators receiving electron bunches from each of the opposed electron beam accelerators.

2. The compact two-beam push-pull free electron laser of claim 1 wherein each of the opposed electron beam accelerators comprises:

a) a gun for the production of electron bunches;

b) a cryocavity;

c) a separator magnet for orienting the electron bunches from the first of said opposed electron beam accelerators onto an axis and conducting electron bunches generated by the second of the opposed electron beam accelerators and emanating from the wiggler to a dump; and d) a cryomodule for accelerating the electron bunches and having an axis coincident with the axis onto which the separator magnet has oriented the electron bunches.

3. The compact two-beam push-pull free electron laser of claim 2 further including an opposed pair of partial mirrors for the receipt of light pulses emanating from the wiggler, which partial mirror reflects light pulses produced by the wiggler back along the axis.

* * * * *